United States Patent Office 3,463,862
Patented Aug. 26, 1969

3,463,862
ALBUMIN CONTAINING COSMETIC LOTION
Geneva Carol Mazza, 11805 Mentone Road,
Silver Spring, Md. 20901
No Drawing. Filed May 21, 1964, Ser. No. 369,287
Int. Cl. A61k 7/02
U.S. Cl. 424—359         2 Claims

ABSTRACT OF THE DISCLOSURE

A cosmetic lotion for application to the skin is disclosed, which tightens the same and smoothes wrinkled areas for as long as 10 to 12 hours. It consists essentially of albumin, an astringent and a non-irritating oil.

---

This invention relates to an improved lotion for topical cosmetic application. In one particular embodiment it relates to a skin lotion which acts as a skin tightener and smoothes wrinkled areas of the skin. More particularly the invention relates to a cosmetic lotion of the class described comprising a water-in-oil type emulsion having three essential ingredients.

I have discovered a skin lotion of the type described which gives a greatly improved result over the commercially available products in that it works more rapidly and has more desirable properties. The effectiveness of my lotion depends on a careful blending of three essential ingredients:

(a) a source of albumin
(b) an astringent
(c) an oil that is non-irritating to the skin, has the right drying properties and is of the proper consistency to aid in the application of the lotion.

The albumin may be derived from any suitable source. A particularly suitable and readily available source of albumin is the white of eggs. This source is a particularly attractive source for laboratory scale operation. However, for longer scale operation the use of the commercially available dried egg white may be advantageous. If the albumin is added as dried egg white it should be reconstituted by the addition of water to the consistency of the natural product.

Any astringent which gives a suitable action may be used. A particularly desirable astringent is a solution of alum (potassium aluminum sulfate). The alum solution may be a 5 to 20 percent aqueous solution but preferably about 10 percent aqueous solution.

The oil is particularly important. The oil used in my novel lotion must have the most desirable drying properties and be of such consistency that it aids in application of the lotion to the skin. In addition the oil must not have any tendency to irritate normal skin. I have found that a commercially available linseed oil (U.S.P. grade) gives particularly desirable results.

Broadly speaking, in preparing my novel lotion, the albumin is mixed with the astringent solution by adding the astringent to the albumin and dispersed rapidly either by suitable shaking or stirring. The oil is then added and the formulation mixed well. The mixture is aged for a suitable period of time and then passed through a coarse filter to aid the dispersion and to give the product the proper viscosity.

In view of the nutrient properties of albumin for microorganisms, suitable preservatives should be incorporated with the albumin in the aqueous phase. In compounding my cosmetic lotion sodium benzoate, benzoic acid, boric acid etc., are suitable preservatives should be present in the amount of 0.005 to 0.5 weight percent. In preparing my improved lotion, the albumin should be present as a liquid having the viscosity of egg whites in an amount equal to about 80 to 320 parts by volume of the final formulation, preferably about 160 parts by volume. The astringent should be present in about 1 to 4 parts by volume of the final formulation, preferably about 2 parts of the formulation. Any suitable organic or inorganic astringent may be used. Tincture of benzoin and alum are two examples of suitable astringents. Particularly good results have been achieved by using 10 percent solution of alum (potassium aluminum sulfate) U.S.P. grade to provide the astringent properties of the lotion.

The oil is present, preferably as a U.S.P. grade linseed oil in an amount equal to about 0.5 to 2 preferably about 1 part by volume of the formulation. Obviously other components may be added to this formulation and improvement in certain of the properties may result by this addition.

The success of my lotion depends on the interaction of the three primary ingredients. These ingredients must be present in the proportions stated in each of the formulations. As generally illustrative of a complete lotion formulation of this type it will be understood that the lotion may contain the following constituents based on parts of the final formulation.

The Water Phase

Albumin preferably as natural or reconstituted
  egg whites _____ parts by volume __ 80 to 320
10 percent aqueous solution of U.S.P. grade
  alum _____ do____ 0.5 to 2
Benzoic acid _____ (percent)__ .001 to .5

The Oil Phase
                                        Parts by volume
Lanolin _____  1½ to 3
Linseed oil U.S.P. grade _____    3 to 6
Vegetable oil (such as corn oil) _____  0.5 to 3

In the foregoing formulation certain substitutions and variations can be made. A small amount of hydrogenated vegetable oil such as cotton seed oil may be substituted for the corn oil and some of the lanolin.

The lanolin can be any pure product. A purified lanolin derivative such as the commercially available lanolin fraction sold under the trade name of Lantrol sold by Malmstrom Chemical Corp. is one convenient source of the lanolin.

The procedure of preparing my improved cosmetic lotion compares quite closely with procedures generally used for preparing such lotions. The astringent is added slowly to the albumin and stirred until mixed thoroughly. This phase is aged until it is no longer turbid. The albumin is preferably added as egg white or as the reconstituted dried product having essentially the same viscosity as the natural product.

When lanolin is used the lanolin is warmed and added to the linseed oil and corn oil mixture and this mixture is mixed with the alubumin source which contains a preservative such as benzoic acid. The mixture is then stirred thoroughly and the oil phase and the water phase are mixed to form a water-in-oil emulsion which is passed through a coarse filter.

The invention is further illustrated by following specific but non-liimting examples.

EXAMPLE I

A cosmetic lotion was prepared as a water-in-oil phase emulsion. The two components had the following composition:

Oil Phase
Components:                              Parts by volume
  Anhydrous lanolin _____  2
  Corn oil (palatable) _____  1
  Linseed oil U.S.P. grade _____  6

Water Phase

| | |
|---|---|
| Egg white | 320 |
| Sodium benzoate | 1 |
| 10% solution of alum | 8 |

The oil phase was prepared by heating the lanolin and adding the lanolin to the linseed oil-corn oil mixture. One part by volume of the oil phase component was emulsified with 161 parts by volume of the liquid phase components by shaking the mixture together followed by filtration through a coarse filter.

The lotion was applied to the face by first using a moisture cream, removing the cream and applying a foundation makeup. The lotion was applied to the areas where wrinkles appear by applying sparingly using an outward motion in one direction.

The wrinkled areas were smoothed after about 10 minutes. The lotion was effective for a period as long as 10 to 12 hours.

EXAMPLE II

A cosmetic lotion was prepared as in Example I.

The water and aqueous phase had the following compositions:

Oil Phase

| Components: | Parts by volume |
|---|---|
| Lanolin | 1 |
| Corn oil | 1 |
| Glycerin | 1 |
| Liquid petrolatum | 1 |
| Linseed oil | 7 |

Aqueous Phase

| | |
|---|---|
| Egg white | 160 |
| Astringent (10 percent solution of alum) | 2 |
| Benzoic acid ___percent | 0.05 |

The liquid phase and oil phases were prepared separately. One part of the oil phase was mixed with 162 parts of the aqueous phase. The lotion was applied to the face using the technique described in Example I. The results were equally pleasing.

EXAMPLE III

A cosmetic lotion was prepared as a water-in-oil phase emulsion wherein the water and oil phase had the following composition:

Oil Phase

| Components: | Parts by volume |
|---|---|
| Linseed oil U.S.P. grade | 1 |

Water Phase

| | |
|---|---|
| Egg white | 160 |
| Alum (10 percent solution) | 1 |
| Boric acid ___percent | 0.05 |

The oil and water phases were mixed thoroughly by shaking and the lotion filtered through a coarse filter. The lotion was applied to the face using the techniques of Example I. As in the previous examples the wrinkled areas were smoothed after the subject relaxed for about 3 to 5 minutes. The lotion was effective for a protracted period of time.

It will, of course, be recognized in cosmetic creams it to customary to include trace amounts of essential oils or the like to provide the desired odor to the product. These have been omitted from the formulations of the foregoing examples since the odor characteristics of products of this sort can be varied widely to suit a particular manufacturer or distributor. It might be desirable in a large percentage of the cases to omit these constituents altogether. These perfume oils and coloring agents, if desired would normally be incorporated in the oil phase prior to emulsion formulation by addition of the aqueous phase.

My novel formulation gives a desirable result with a minimum of time and effort. It is long lasting and contains no drugs or components that might cause irritation to normal skin.

What is claimed is:

1. A cosmetic film forming lotion capable of smoothing wrinkled skin for periods of up to 12 hours consisting of an emulsion of the water in oil type wherein, based on the volume of the final product the oil phase contains, 1.5 to 3 parts lanolin, 3 to 6 parts linseed oil and 0.5 to 3 parts corn oil or cottonseed oil, and the aqueous phase contains about 80 to 320 parts of natural egg white, 0.5 to 2 parts of a 10 percent solution of alum, 0.01 to 0.5% of the volume of the albumin of benzoic acid as a preservative for the albumin.

2. A cosmetic film forming lotion capable of smoothing wrinkled skin for periods of up to 12 hours consisting of an emulsion of the water in oil type wherein based on the volume of the final product the oil phase contains about 4 parts of linseed oil, 1 part of corn oil, 2 parts of lanolin and the liquid phase contains about 160 parts of natural egg whites, 1.5 parts of a 10% alum solution and 0.01 to 0.5% of the volume of the albumin of boric acid as a preservative.

References Cited

FOREIGN PATENTS

| | | |
|---|---|---|
| 192,840 | 2/1923 | Great Britain. |
| 224,216 | 1926 | Great Britain. |
| 7,440 | 3/1905 | Denmark. |
| 23,018 | 4/1918 | Denmark. |
| 851,701 | 10/1939 | France. |
| 337,308 | 5/1959 | Switzerland. |

OTHER REFERENCES

Harry, Principles and Practice of Modern Cosmetics, Chemical Publishing Co., New York, N.Y. (1963), pp. 22–24, 82–84 and 249–54.

Janistyn, Riechstaffe, Seifen Kosmetika, Dr. Alfred H. Verlag, Heidelberg, Germany (1950), pp. 383–384 (vol. II).

Winter, Handbuch, De Gesamten Parfumedrie and Kosmetik, Springer-Verlag, Vienna, Austria (1952), p. 187.

Sagarin, Cosmetics—Science and Technology, Interscience Publishing, New York (1957), pp. 105–106, 1035 and 1053.

ALBERT T. MEYERS, Primary Examiner

V. C. CLARKE, Assistant Examiner